United States Patent
Chen et al.

(10) Patent No.: US 7,773,303 B2
(45) Date of Patent: Aug. 10, 2010

(54) IMAGE PROJECTING APPARATUS

(75) Inventors: Chiu-Ping Chen, Chu Nan (TW);
Chien-Chung Liao, Chu Nan (TW);
Chin-Ku Liu, Chu Nan (TW)

(73) Assignee: Coretronic Corporation, Chu Nan (TW)

( * ) Notice: Subject to any disclaimer, the term of this patent is extended or adjusted under 35 U.S.C. 154(b) by 634 days.

(21) Appl. No.: 11/636,617

(22) Filed: Dec. 11, 2006

(65) Prior Publication Data
US 2007/0188878 A1 Aug. 16, 2007

(30) Foreign Application Priority Data
Feb. 16, 2006 (TW) .............................. 95105230 A (51) Int. Cl.
G02B 3/00 (2006.01)
G02B 9/00 (2006.01)
(52) U.S. Cl. ...................................... 359/649; 359/738
(58) Field of Classification Search ................ 359/738, 359/739, 740, 649–451
See application file for complete search history.

(56) References Cited

U.S. PATENT DOCUMENTS

| 4,810,076 | A | * | 3/1989 | Murao et al. ................. 359/738 |
| 6,547,398 | B2 | | 4/2003 | Cho |
| 6,798,584 | B2 | * | 9/2004 | Matsumoto et al. ......... 359/738 |
| 6,827,452 | B2 | | 12/2004 | Tzong |

FOREIGN PATENT DOCUMENTS

| TW | 579451 | 3/2004 |
| TW | I247962 | 1/2006 |

* cited by examiner

*Primary Examiner*—Scott J Sugarman
(74) *Attorney, Agent, or Firm*—Davidson Berquist Jackson & Gowdey LLP (57) ABSTRACT

An image projecting apparatus includes a light source, a relay lens, a reflective light valve, and a projection lens. The light source is capable of emitting a light beam. The relay lens is disposed to permit the light beam provided by the light source to pass therethrough, and has a lens periphery formed with a notch. The reflective light valve is spaced apart from the relay lens, and is disposed to receive and modulate the light beam passing through the relay lens into an image light beam. The projection lens is disposed proximate to the notch of the relay lens, and is capable of projecting the image light from the reflective light valve to display an image onto a screen. The relay lens has a plurality of light-absorbing regions proximate to the notch for reducing a light-splitting effect attributed to the notch.

18 Claims, 7 Drawing Sheets

IMAGE PROJECTING APPARATUS

CROSS-REFERENCE TO RELATED APPLICATION

This application claims priority of Taiwanese Application No. 095105230, filed on Feb. 16, 2006.

BACKGROUND OF THE INVENTION

1. Field of the Invention

The invention relates to a display apparatus, more particularly to an image projecting apparatus.

2. Description of the Related Art

Figure 1:
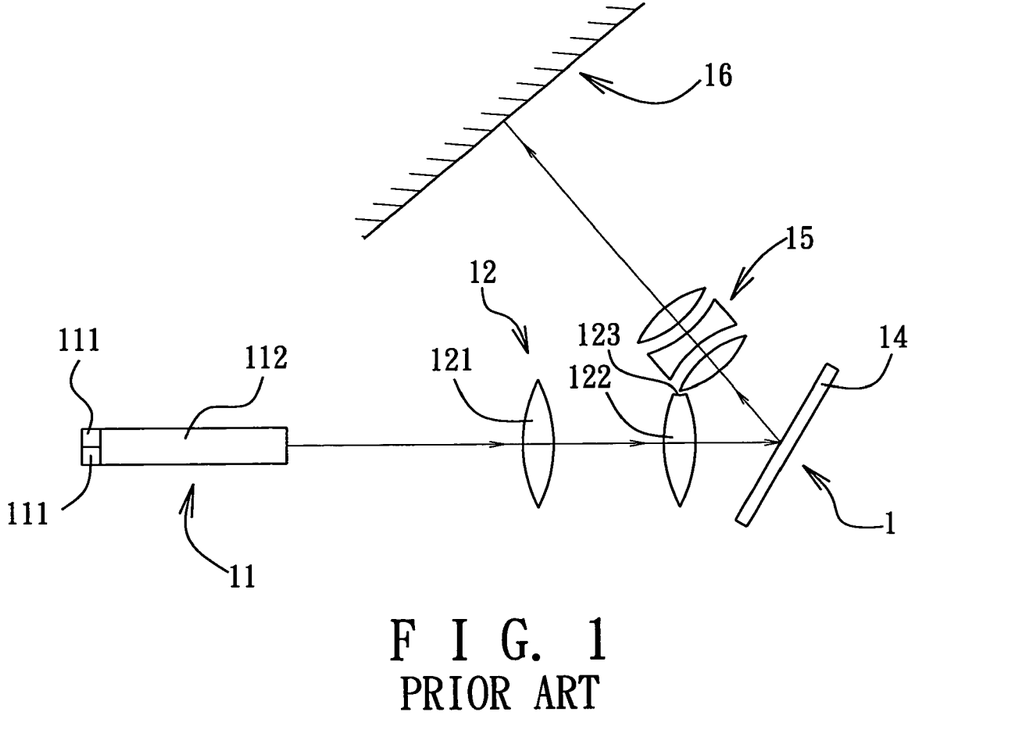
FIG. 1 is a schematic view of a conventional image projecting apparatus.

As shown in FIG. 1, a conventional image projecting apparatus 1 used in a conventional non-telecentric optical system is for displaying an image onto a screen 16. The conventional image projecting apparatus 1 includes a light-emitting unit 11, a lens unit 12, a reflective light valve 14, and a projection lens 15.

The light-emitting unit 11 includes a plurality of light emitting diodes (LEDs) 111 for providing a light beam, and an integration rod 112 for homogenizing the light beam provided by the LEDs 111. The lens unit 12 includes a condenser 121, and a relay lens 122, which is formed with a notch 123. The lens unit 12 receives the light beam from the integration rod 112, and is capable of adjusting the size of the light beam passing therethrough. Specifically, the size of the light beam passing through the lens unit 12 is adjusted by adjusting the distance between the condenser 121 and the relay lens 122, which is determined by focal lengths thereof. In other words, the size of the light beam passing through the lens unit 12 is controlled by the focal lengths of the condenser 121 and the relay lens 122.

The reflective light valve 14 modulates the light beam exiting the lens unit 12 into an image light. The projection lens 15 receives the image light and projects the image onto the screen 16.

Figure 2:
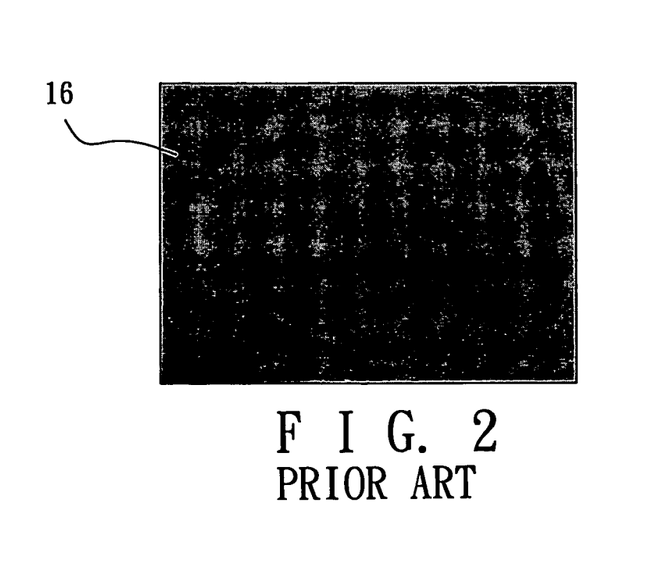
FIG. 2 is an experimental result of an image projected by the conventional image projecting apparatus, illustrating significant color deviation and low color uniformity thereof.

When the conventional image projecting apparatus 1 is to have a low offset, i.e., an offset of between 100% and 110%, the relay lens 122 of the lens unit 12 is required to be disposed in close proximity of the projection lens 15. Therefore, the relay lens 122 is formed with the notch 123 at a lens periphery thereof so as to shorten the distance between the relay lens 122 and the projection lens 15. As a required offset decreases, the size of the notch 123 is increased. However, the non-uniformity of the notch 123 introduces a light-splitting effect, such as that of a prism, into the relay lens 122. As shown in FIG. 2, colors of the image projected on the screen 16 are not uniform due to the light-splitting effect. Specifically, red light, blue light, etc. are visible at corners of the screen 16 when the image should be an all-white image. This results in significant color deviation and low color uniformity near the corners of the image light mainly attributed to the notch 123 in the relay lens 122.

SUMMARY OF THE INVENTION

Therefore, the object of the present invention is to provide an image projecting apparatus capable of providing an image with lower color deviation and higher color uniformity as compared to the prior art.

According to one aspect of the present invention, there is provided an image projecting apparatus that includes a light source, a relay lens, a reflective light valve, and a projection lens. The light source is capable of emitting a light beam. The relay lens is disposed to permit the light beam provided by the light source to pass therethrough, and has a lens periphery formed with a notch. The reflective light valve is spaced apart from the relay lens, and is disposed to receive and modulate the light beam passing through the relay lens into an image light beam. The projection lens is disposed proximate to the notch of the relay lens, and is capable of projecting the image light beam from the reflective light valve to display an image onto a screen. The relay lens has a plurality of light-absorbing regions proximate to the notch for reducing a light-splitting effect attributed to the notch.

According to another aspect of the present invention, there is provided an image projecting apparatus that includes a light source, a reflector, a reflective light valve, and a projection lens. The light source is capable of emitting a light beam. The reflector is disposed to receive and reflect the light beam provided by the light source, and has a periphery formed with a notch. The reflective light valve is spaced apart from the reflector, and is disposed to receive and modulate the light beam reflected by the reflector into an image light beam. The projection lens is disposed proximate to the notch of the reflector, and is capable of projecting the image light beam from the reflective light valve to display an image onto a screen. The reflector is provided with a plurality of light-absorbing regions proximate to the notch for reducing a light-splitting effect attributed to the notch.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted herein that like elements are denoted by the same reference numerals throughout the disclosure.

Figure 3:
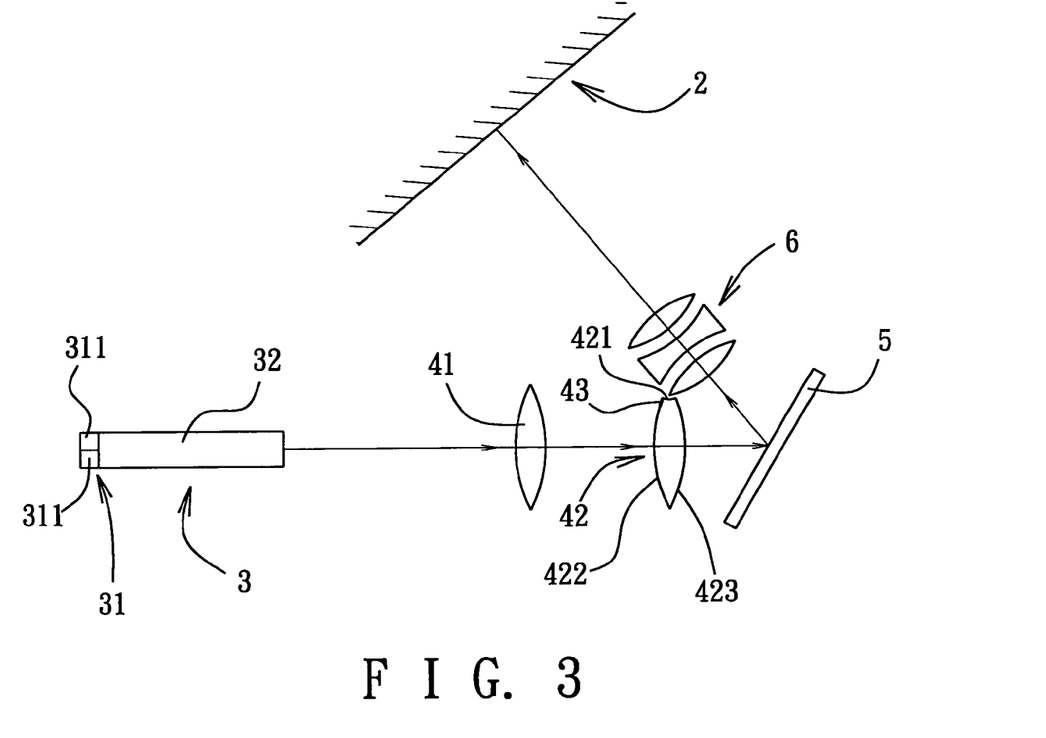
FIG. 3 is a schematic view of a first preferred embodiment of an image projecting apparatus according to the present invention.

As shown in FIG. 3, the first preferred embodiment of an image projecting apparatus according to the present invention is for projecting an image light to display an image onto a screen 2, and includes a light-emitting unit 3, a lens unit 4, a reflective light valve 5, and a projection lens 6.

Figure 4:
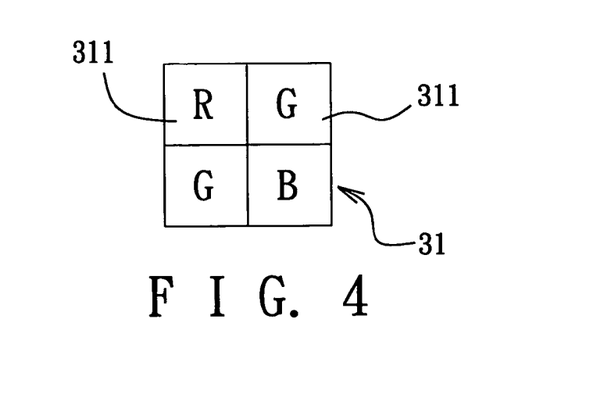
FIG. 4 is a schematic view illustrating a light source of the first preferred embodiment.

The light-emitting unit 3 includes a light source 31 for providing a light beam, and an integration rod 32 disposed to receive the light beam provided by the light source 31 for homogenizing the light beam. The light source 31 includes a plurality of light-emitting diodes 331. In this embodiment, the light source 31 includes four light-emitting diodes 331, as shown in FIG. 4. One of the light-emitting diodes 311 is a blue-light light-emitting diode (B), another one of the light-emitting diodes 311 is a red-light light-emitting diode (R), and the rest of the light-emitting diodes 311 are green-light light-emitting diodes (G). It should be noted herein that the light-emitting diodes 311 are not limited to the specific number, wavelength, or arrangement as illustrated in this embodiment.

Figure 5:
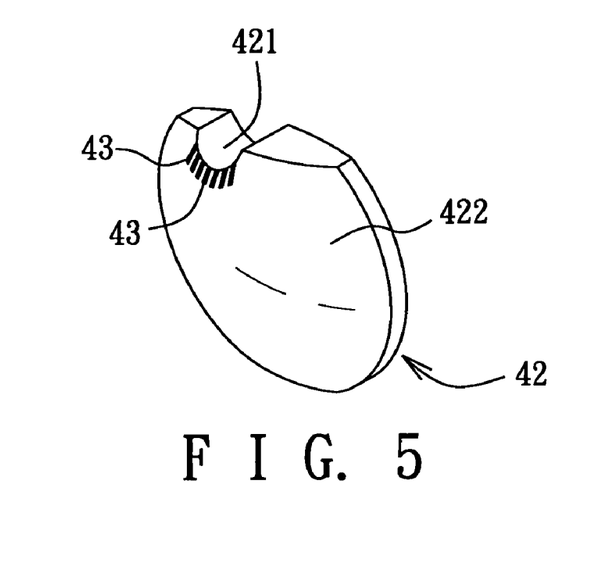
FIG. 5 is a perspective view of a relay lens of the first preferred embodiment, where light-absorbing regions thereof are spaced apart from each other.

As shown in FIG. 3 and FIG. 5, the lens unit 4 includes a condenser 41 and a relay lens 42 aligned with and spaced apart from each other. The lens unit 4 receives the light beam from the integration rod 32 of the light-emitting unit 3, and is capable of adjusting the size of the light beam passing therethrough. Specifically, the size of the light beam passing through the lens unit 4 is adjusted by adjusting the distance between the condenser 41 and the relay lens 42, which is determined by focal lengths thereof. In other words, the size of the light beam passing through the lens unit 4 is controlled by the focal lengths of the condenser 41 and the relay lens 42. It should be noted herein that when adjusting the size of the light beam is not required, the condenser 41 is replaced by other lenses.

The relay lens 42 has a lens periphery formed with a notch 421, and a plurality of light-absorbing regions 43, such as gratings, spaced apart from each other and disposed proximate to the notch 421 for reducing a light-splitting effect attributed to the notch 421. Note that, when the image projecting apparatus is used in a non-telecentric system (not shown), as the required offset of the non-telecentric system decreases, the size of the notch 421 is increased. In this embodiment, the relay lens 42 is a biconvex lens, but it can also be a biconcave lens or a meniscus lens in other embodiments of the present invention. The light-emitting unit 3 and the lens unit 4 cooperate to form an illumination system.

Figure 6:
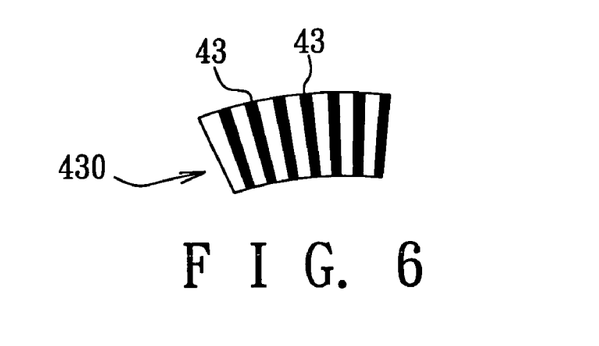
FIG. 6 is a fragmentary schematic view of the relay lens, illustrating a first exemplary arrangement of the light-absorbing regions.
Figure 7:
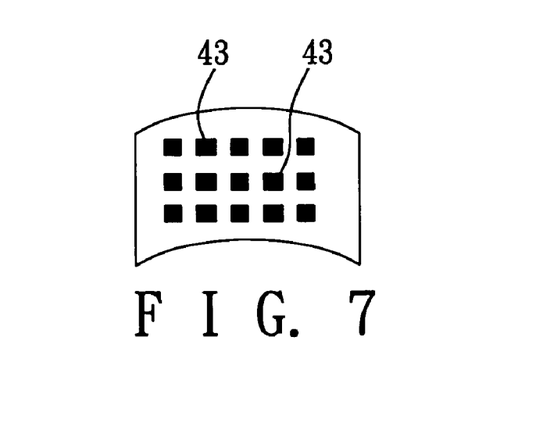
FIG. 7 is a fragmentary schematic view of the relay lens, illustrating a second exemplary arrangement of the light-absorbing regions.
Figure 8:
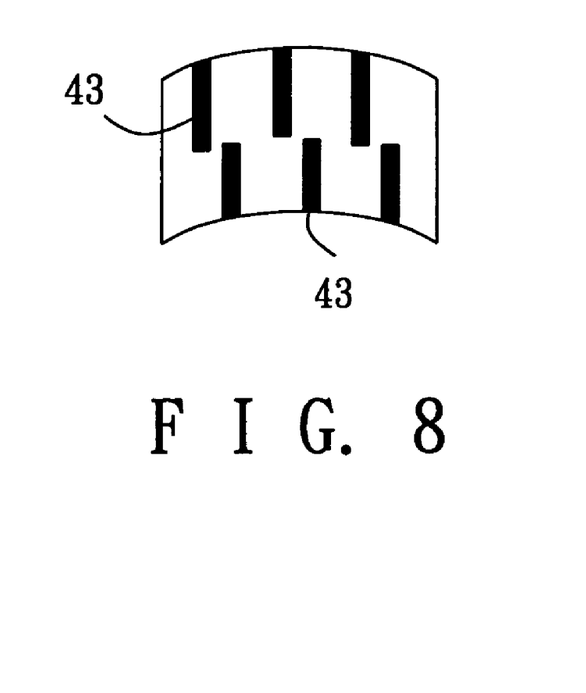
FIG. 8 is a fragmentary schematic view of the relay lens, illustrating a third exemplary arrangement of the light-absorbing regions.
Figure 9:
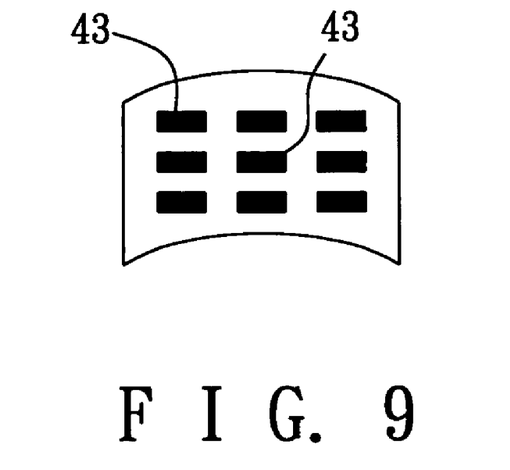
FIG. 9 is a fragmentary schematic view of the relay lens, illustrating a fourth exemplary arrangement of the light-absorbing regions.
Figure 10:
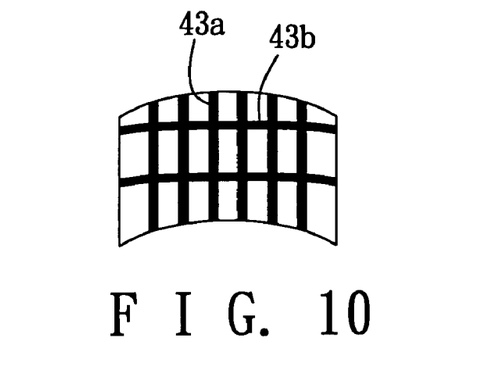
FIG. 10 is a fragmentary schematic view of the relay lens, illustrating a fifth exemplary arrangement of the light-absorbing regions.
Figure 11:
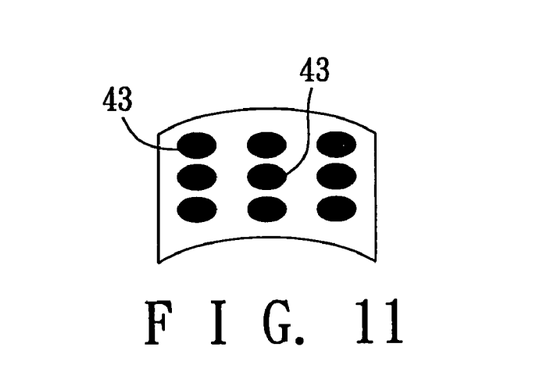
FIG. 11 is a fragmentary schematic view of the relay lens, illustrating a sixth exemplary arrangement of the light-absorbing regions.

As shown in FIG. 6, the light-absorbing regions 43 are substantially rectangular in shape in this embodiment, and are configured as a grid 430, where the light-absorbing regions 43 are substantially parallel to and equally spaced apart from each other. In addition, the light-absorbing regions 43 are black colored so as to absorb the light beam within the visible light wavelength range. The light-absorbing regions 43 can be provided on the relay lens 42 by adhering black tape strips thereto. However, the color, shape, arrangement, and the light-absorbing coefficients of the light-absorbing regions 43 are not limited to those disclosed hereinabove. For example, the light-absorbing regions 43 have different light-absorbing coefficients for the light beam within different wavelength ranges. Furthermore, the light-absorbing regions 43 have different light-absorbing coefficients for the light beam within different wavelength ranges, where the light-absorbing coefficients of the light-absorbing regions 43 for a particular wavelength range are different from each other. The light-absorbing regions 43 can also be arranged as in the first to fourth exemplary arrangements illustrated in FIGS. 6 to 9. As shown in FIG. 10, the light-absorbing regions 43 include a set of longitudinal light-absorbing strips 43a and a set of lateral light-absorbing strips 43b that intersect the longitudinal light-absorbing strips 43a. Moreover, each of the light-absorbing regions 43 can have an oval shape as shown in FIG. 11.

Referring back to FIG. 3, the relay lens 42 further has a light-incident side 422 for receiving the light beam exiting the condenser 41, and a light-exit side 423 for the light beam passing through the relay lens 42 to exit therefrom. The light-absorbing regions 43 are provided on the light-incident side 422 in this embodiment. However, the light-absorbing regions 43 can also be provided on the light-exit side 423 in other embodiments according to the present invention.

The reflective light valve 5 is spaced apart from the relay lens 42, and is disposed to receive and modulate the light beam exiting the relay lens 42 into an image light. In this embodiment, the reflective light valve 5 is a digital micromirror device (DMD), but it can also be a liquid crystal on Silicon (LCOS) or a grating light valve in other embodiments of the present invention.

The projection lens 6 is disposed proximate to the notch 421 of the relay lens 42, and is capable of projecting the image light beam from the reflective light valve 5 to display the image onto the screen 2.

Figure 12:
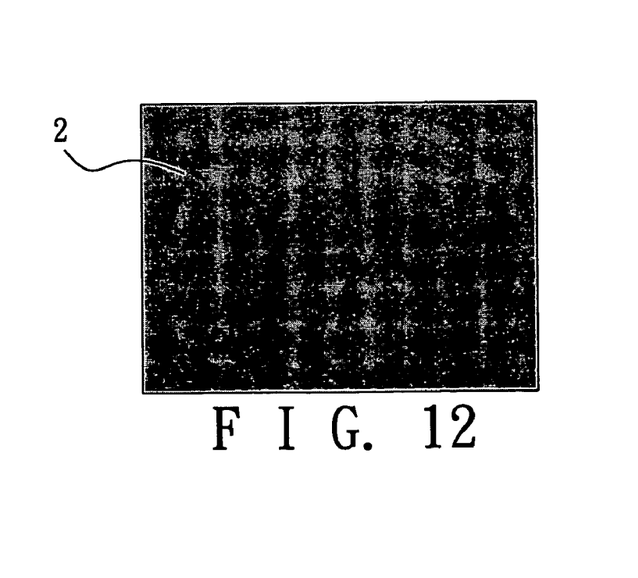
FIG. 12 is an experimental result of an image projected by the image projecting apparatus according to the first preferred embodiment, illustrating low color deviation and high color uniformity thereof.

After the light beam enters the light-incident side 422 of the relay lens 42, the light within certain wavelength ranges is absorbed or blocked by the light-absorbing regions 43, depending on the light-absorbing coefficients of the light-absorbing regions 43. As a result, the light-splitting effect attributed to the notch 421 is reduced, and color deviation and non-uniformity are corrected. FIG. 12 is an experimental result of an all-white image projected by the image projecting apparatus of the first preferred embodiment onto the screen 2, where improved color uniformity is apparent. Specifically, due to the reduction of the light-splitting effect, color deviation of portions of the image at the corners of the screen 2 is reduced to a minimum.

Figure 13:
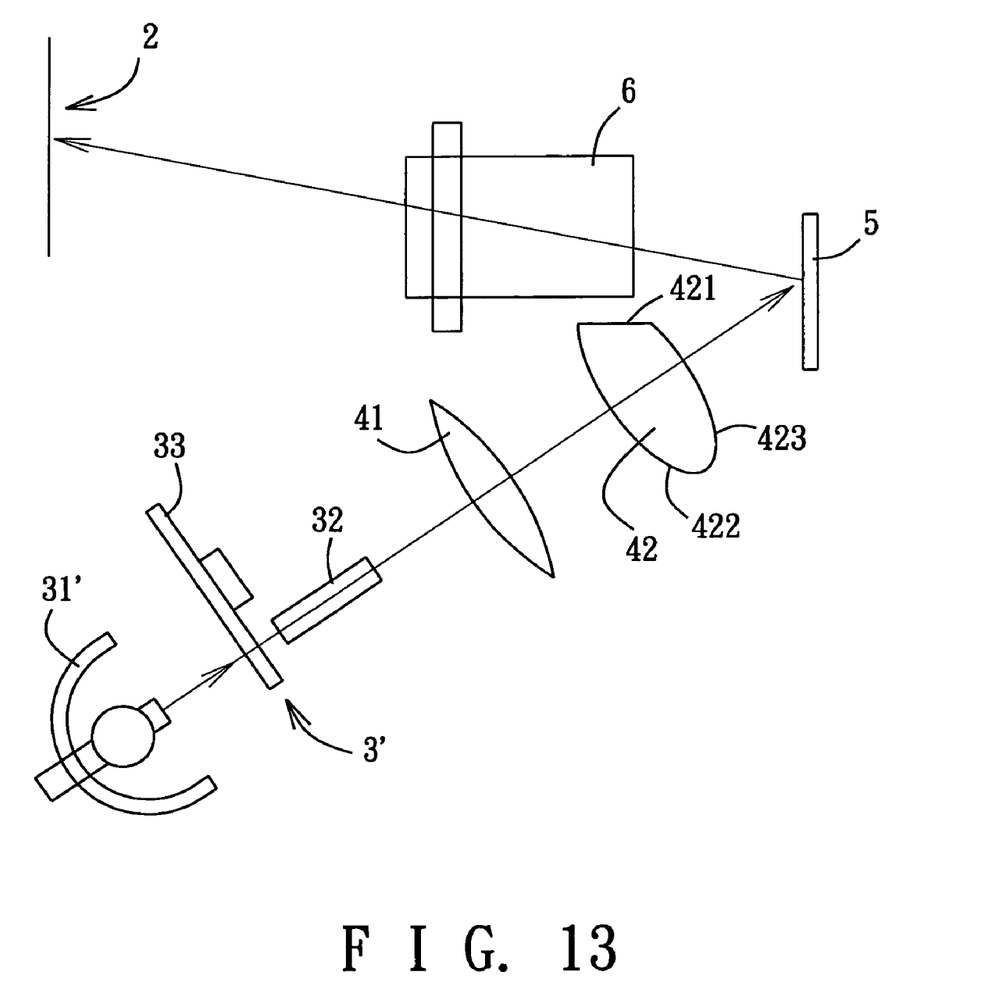
FIG. 13 is a schematic view of a second preferred embodiment of an image projecting apparatus according to the present invention.

Referring to FIG. 13, a second preferred embodiment of an image projecting apparatus according to the present invention differs from the first preferred embodiment in that the light source 31' of the light-emitting unit 3' provides a composite light beam (i.e., white light). The light source 31' is a white-light light-emitting diode, an ultra high pressure (UHP) lamp, a metal halide lamp, or a xenon lamp. Moreover, the light-emitting unit 3' further includes a color wheel 33 spaced apart from the light source 31'. In this embodiment, the light source 31' is an UHP lamp, and the integration rod 32 is disposed between the color wheel 33 and the condenser 41 of the lens unit 4. However, when the light source 31' is a white-light LED, the integration rod can be disposed instead between the light source 31' and the color wheel 33.

Figure 14:
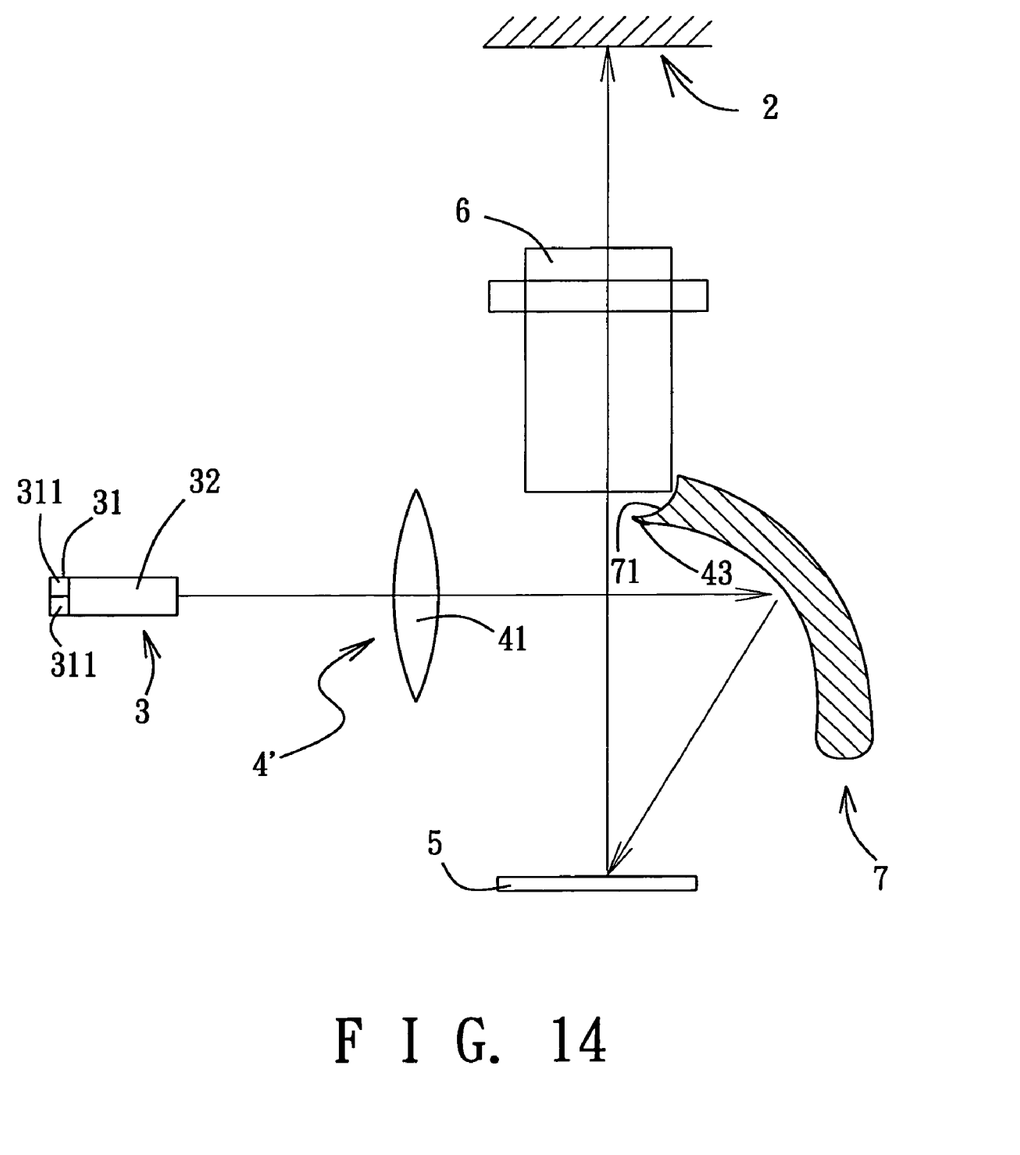
FIG. 14 is a schematic view of a third preferred embodiment of an image projecting apparatus according to the present invention.

As shown in FIG. 14, the third preferred embodiment of an image projecting apparatus according to the present invention differs from the first preferred embodiment in that the relay lens is not required in the lens unit 4' i.e., the lens unit 4' includes only the condenser 41, and a reflector 7 is included in the image projecting apparatus. The light-emitting unit 3, the condenser 41, and the reflector 7 cooperate to form an illumination system.

The reflector 7 is disposed between the condenser 41 and the reflective light valve 5 to receive the light beam after homogenized provided by the integration rod 32 of the light-emitting unit 3 and exiting the condenser 41, and to reflect the light beam toward the reflective light valve 5. The reflector 7 has a periphery formed with a notch 71, and is provided with a plurality of the light-absorbing regions 43 proximate to the notch 71. In this embodiment, the reflector 7 is a convex mirror, but it can also be a concave mirror in other embodiments of the present invention.

The reflective light valve 5 is spaced apart from the reflector 7, and is disposed to receive and modulate the light beam reflected by the reflector 7 into the image light beam.

The projection lens 6 is disposed proximate to the notch 71 of the reflector 7, and is capable of projecting the image light beam from the reflective light valve 5 to display the image onto the screen 2.

The notch 71 in the reflector 7 can result in splitting of the light beam exiting the condenser 41 before the light beam is reflected by the reflector 7 toward the reflective light valve 5. To reduce the light-splitting effect to a minimum, the light-absorbing regions 43 absorb the light beam within certain wavelength ranges so that they are not reflected toward the reflective light valve 5 to prevent adverse effects on the color uniformity and color deviation of the image light beam.

In sum, by providing and by appropriately arranging a plurality of the light-absorbing regions 43 to the relay lens 42 (FIG. 3) or the reflector 7 (FIG. 14) proximate to the notch 421, 71 thereof, the present invention is capable of reducing the light-splitting effect attributed to the notch 421, 71. This is achieved because the light beam within certain wavelength ranges is absorbed by the light-absorbing regions 43, depending on the light-absorbing coefficients of the light-absorbing regions 43. As a result, color non-uniformity in the image light beam can be corrected. When the image should appear all white on the screen 2, no red light, or blue light, etc. is apparent at corners of the screen 2. Therefore, the color uniformity is improved, and the color deviation problem is reduced for the image as compared to the prior art.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. An image projecting apparatus comprising:
   a light source capable of emitting a light beam;
   a relay lens disposed to permit said light beam provided by said light source to pass therethrough, and having a lens periphery formed with a notch;
   a reflective light valve spaced apart from said relay lens, and disposed to receive and modulate said light beam passing through said relay lens into an image light beam; and
   a projection lens disposed proximate to said notch of said relay lens, and capable of projecting the image light beam from said reflective light valve to display an image onto a screen;
   wherein said relay lens has a plurality of light-absorbing regions spaced apart from each other and disposed proximate to said notch for reducing a light-splitting effect attributed to said notch.

2. The image projecting apparatus as claimed in claim 1, wherein said light-absorbing regions are capable of absorbing said light beam within visible light wavelength range.

3. The image projecting apparatus as claimed in claim 1, wherein said light-absorbing regions have different light-absorbing coefficients for said light beam within different wavelength ranges.

4. The image projecting apparatus as claimed in claim 3, wherein the light-absorbing coefficients of said light-absorbing regions for a particular wavelength range are different from each other.

5. The image projecting apparatus as claimed in claim 1, wherein each of said light-absorbing regions are selected from a group consisting of a rectangular shape and an oval shape.

6. The image projecting apparatus as claimed in claim 1, wherein said light-absorbing regions include a set of longitudinal light-absorbing strips and a set of lateral light-absorbing strips that intersect said longitudinal light-absorbing strips.

7. The image projecting apparatus as claimed in claim 1, wherein said relay lens further has a light-incident side for receiving said light beam provided by said light source, and a light-exit side for said light beam passing through said relay lens to exit therefrom, said light-absorbing regions being provided on said light-incident side.

8. The image projecting apparatus as claimed in claim 1, wherein said relay lens further has a light-incident side for receiving said light beam provided by said light source, and a light-exit side for said light beam passing through said relay lens to exit therefrom, said light-absorbing regions being provided on said light-exit side.

9. The image projecting apparatus as claimed in claim 1, wherein said relay lens is selected from a group consisting of a biconcave lens, a biconvex lens, and a meniscus lens.

10. The image projecting apparatus as claimed in claim 1, wherein said light source includes at least one light-emitting diode capable of emitting said light beam.

11. An image projecting apparatus comprising:
    a light source capable of emitting a light beam;
    a reflector disposed to receive and reflect the light beam provided by said light source, and having a periphery formed with a notch;
    a reflective light valve spaced apart from said reflector, and disposed to receive and modulate said light beam reflected by said reflector into an image light beam; and
    a projection lens disposed proximate to said notch of said reflector, and capable of projecting the image light beam from said reflective light valve to display an image onto a screen;
    wherein said reflector is provided with a plurality of light-absorbing regions spaced apart from each other and disposed proximate to said notch for reducing a light-splitting effect attributed to said notch.

12. The image projecting apparatus as claimed in claim 11, wherein said light-absorbing regions are capable of absorbing said light beam within visible light wavelength range.

13. The image projecting apparatus as claimed in claim 11, wherein said light-absorbing regions have different light-absorbing coefficients for said light beam within different wavelength ranges.

14. The image projecting apparatus as claimed in claim 13, wherein the light-absorbing coefficients of said light-absorbing regions for a particular wavelength range are different from each other.

15. The image projecting apparatus as claimed in claim 11, wherein each of said light-absorbing regions is selected from a group consisting of a rectangular shape and an oval shape.

16. The image projecting apparatus as claimed in claim 11, wherein said light-absorbing regions include a set of longitudinal light-absorbing strips and a set of lateral light-absorbing strips that intersect said longitudinal light-absorbing strips.

17. The image projecting apparatus as claimed in claim 11, wherein said reflector is selected from a group consisting of a concave mirror and a convex mirror.

18. The image projecting apparatus as claimed in claim 11, wherein said light source includes at least one light-emitting diode capable of emitting said light beam.

* * * * *